United States Patent
Stefanini

(10) Patent No.: US 9,032,610 B2
(45) Date of Patent: May 19, 2015

(54) PROCESS OF ESTABLISHING ELECTRODES IN A LIQUID

(75) Inventor: Daniel Stefanini, Nottingham (GB)

(73) Assignee: HYDROPATH TECHNOLOGY LIMITED, Nottingham (GB)

( * ) Notice: Subject to any disclaimer, the term of this patent is extended or adjusted under 35 U.S.C. 154(b) by 881 days.

(21) Appl. No.: 13/263,098

(22) PCT Filed: Apr. 7, 2010

(86) PCT No.: PCT/GB2010/050595
§ 371 (c)(1),
(2), (4) Date: Dec. 6, 2011

(87) PCT Pub. No.: WO2010/116180
PCT Pub. Date: Oct. 14, 2010

(65) Prior Publication Data
US 2012/0096706 A1   Apr. 26, 2012

(30) Foreign Application Priority Data
Apr. 9, 2009   (GB) .................................. 0906271.2

(51) Int. Cl.
*C02F 1/48*   (2006.01)
*C02F 1/00*   (2006.01)
*C02F 1/461*   (2006.01)

(52) U.S. Cl.
CPC ........... *C02F 1/481* (2013.01); *Y10T 29/49073* (2015.01); *Y10T 29/5313* (2015.01); *C02F 1/006* (2013.01); *C02F 1/46109* (2013.01); *C02F 2201/46125* (2013.01); *C02F 2201/46145* (2013.01); *C02F 2201/483* (2013.01); *C02F 2209/40* (2013.01); *C02F 2301/043* (2013.01); *C02F 2301/046* (2013.01)

(58) Field of Classification Search
CPC ...... C02F 1/006; C02F 1/46109; C02F 1/481; C02F 2209/40; C02F 2301/043; C02F 2301/046; C02F 2201/46125; C02F 2201/46145; C02F 2201/483; Y10T 29/49073; Y10T 29/49075; Y10T 29/5313
USPC .......................... 29/602.1, 606, 607; 210/222
See application file for complete search history.

(56) References Cited

U.S. PATENT DOCUMENTS

| | | | |
|---|---|---|---|
| 1,673,837 A | | 6/1928 | Lotz |
| 4,659,479 A | * | 4/1987 | Stickler et al. ............ 210/222 X |
| 5,380,430 A | * | 1/1995 | Overton et al. ............... 210/222 |
| 5,935,433 A | * | 8/1999 | Stefanini ....................... 210/222 |

(Continued)

FOREIGN PATENT DOCUMENTS

| | | |
|---|---|---|
| DE | 10335880 | 3/2005 |
| FR | 2900060 A1 | 10/2007 |
| GB | 2421449 | 6/2006 |

(Continued)

*Primary Examiner* — A. Dexter Tugbang
(74) *Attorney, Agent, or Firm* — Kirschstein et al.

(57) ABSTRACT

Electrodes are established in a region of an electrically conductive liquid flowing along a pipe, by surrounding the pipe containing the liquid with a core of magnetically conductive material which passes through a primary coil energized by an electrical signal to create an electric field within the liquid, by connecting a secondary passage at the region for the liquid to flow between opposite sides of the core, and by restricting the flow of the liquid in the secondary passage to create an electrical resistance along which an electrical current flows through the liquid.

5 Claims, 1 Drawing Sheet

(56) References Cited

U.S. PATENT DOCUMENTS 6,468,423 B1 * 10/2002 Matsuda ................ 210/222
6,602,411 B1    8/2003 Aida et al.

FOREIGN PATENT DOCUMENTS

| | | | |
|---|---|---|---|
| GB | 2440725 A | 2/2008 | |
| JP | 01043397 A * | 2/1989 | ............ 210/222 |
| JP | 02-214593 | 8/1990 | |
| JP | 0924375 A | 1/1997 | |
| JP | 11-090452 | 4/1999 | |
| JP | 2002-361286 | 12/2002 | |
| WO | 0037365 | 6/2000 | |
| WO | 03018482 | 3/2003 | |

* cited by examiner

PROCESS OF ESTABLISHING ELECTRODES IN A LIQUID

BACKGROUND OF THE INVENTION

This invention relates to the establishment of electrodes in a liquid, in order to treat the liquid by subjecting it to an electric field.

Such treatment might be required for the purpose of influencing, e.g. promoting or inhibiting, chemical, physical or biological processes in the liquid. Conventionally, an electrode or electrodes are simply placed in the liquid which is to be treated, either in a tank containing the liquid or in a pipe or conduit along which the liquid is flowing. The electrode(s) must of course be electrically conductive, usually of a metal or a substance such as carbon. Metal electrodes have in many cases to be of reaction-resistant metal e.g. platinum if they are not to be consumed in use, but even with the use of such materials there can be expected to be some chemical or electro-chemical action between the electrodes and liquid, which is undesirable. Further problems associated with use of electrodes in the liquid include the necessity for establishing electrical connections therewith, by use of electrical cables which must, in the case of a pipe, penetrate the wall of the pipe in a leak-proof manner, as well as the aforementioned selection of suitable electrode materials which will not be consumed in use. Physical electrodes cannot be inserted right-angled to the flow as this will create flow resistance. Electrodes in line with the flow have a reduced effect.

SUMMARY OF THE INVENTION

According to the present invention, we provide a method, and apparatus, wherein an effect of establishing electrodes in a region of a liquid is achieved by providing a core of magnetically-conductive material around a lateral wall containing the region of the liquid, the core of magnetically conductive material passing through a primary coil energised by an electrical signal, and wherein respective parts of the region of the liquid on opposite sides of the magnetically conductive core are connected by a passage containing the liquid, the passage and liquid affording a selected electrical resistance.

Preferably the selected electrical resistance is afforded by the liquid within the passage.

The electrical resistance afforded by the passage and/or the liquid therein may be adjustable.

In accordance with the invention, liquid being treated is subject to an electric field by virtue of its disposition within the core of magnetically conductive material, inductively coupled to the primary coil provided on the core. In effect, in the case of liquid in a pipe surrounded by the core of magnetically conductive material, the liquid has two electrodes at right-angle to the flow, which are equivalent to conventional physical electrodes in the sense that they form a voltage source and a current flows between them dependent on the resistance between them, established in it. The electrodes are spaced lengthwise of the pipe and separated from one another by a distance determined by the dimension of the magnetic core in the direction lengthwise of the pipe.

Current flowing between the electrodes which are effectively established in the liquid may be controlled by adjustment of the electrical resistance presented by the connecting passage, which provides, with the liquid within it, a conducting path between the electrodes. In the case of a passage which is not electrically conductive, e.g. a pipe made of a plastics material, the electrical resistance is afforded by the liquid contained thereby, and the resistance may be adjusted by altering the length of passage and/or its cross-sectional area. An adjustable restriction, e.g. a flow-control valve, may be provided in the passage.

In the case of a passage formed of a material which is electrically conductive in its own right, a length of less conductive or non-conductive material may be provided in the passage to ensure the electrodes are not short-circuited thereby.

The primary coil provided on the core of the magnetically-conductive material may be provided with an electrical signal of any desired wave form and/or frequency, to suit the purpose of establishing the electrodes in the liquid.

Another way in which the electrical resistance afforded by the liquid in the passage may be controlled or adjusted is by providing a further core and electrically-energised primary coil around the wall of the passage. In effect, this establishes further electrodes in the liquid in the passage, to constitute a voltage source to oppose or augment the effect of the first-mentioned electrodes established by the first core and primary coil. It would, alternatively, be possible to dispose controlling electrodes physically in the liquid in the passage, but, since the invention has as one of its advantages the elimination of the need for physical electrodes in the liquid, one would not, in general, wish to introduce controlling electrodes.

BRIEF DESCRIPTION OF THE DRAWINGS

The invention will now be described by way of example with reference to the accompanying drawings, of which.

DETAILED DESCRIPTION OF THE PREFERRED EMBODIMENTS

Referring firstly to the drawings, a pipe or conduit for carrying an electrically conductive liquid to be treated, for example, water, is indicated at 10. The pipe extends through the centre of an annular core 12 of magnetically-conductive material, e.g. a suitable ferrite material, or a plurality of "soft" iron laminations, insulated from one another to reduce eddy current losses, analogous to a transformer core. As seen in FIG. 2, the core 12 may comprise a plurality of relatively short individual elements or assemblies of elements 12a, 12b and so on, joined to one another by fasteners such as bolts to establish a magnetically-continuous core. Shown in FIG. 1 only is a primary coil 14 through which the core 12 extends, the primary coil 14 being supplied with an electrical signal, from a suitable signal generator (not shown), with an electrical signal which may be of any desired wave form, e.g. a succession of pulses, and frequency.

Figure 1:
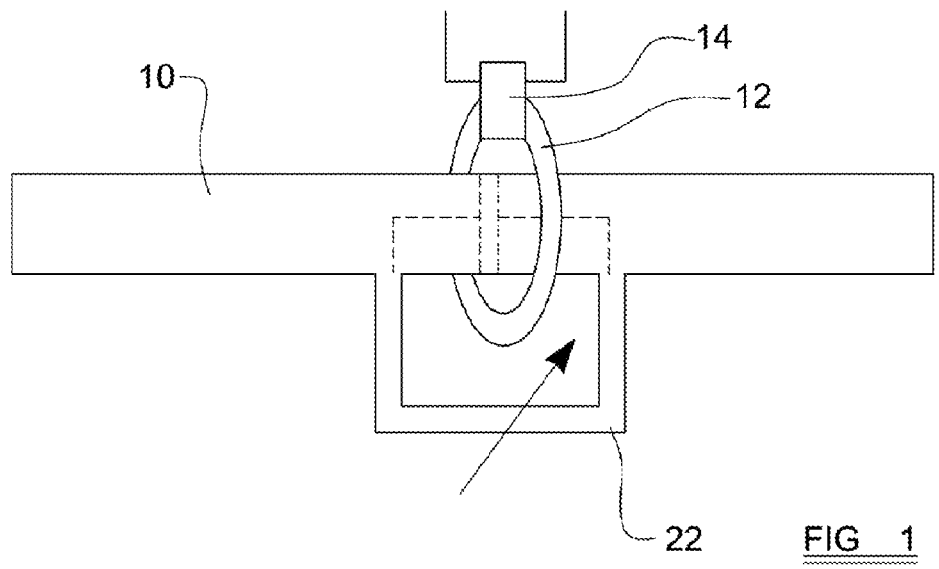
FIG. 1 is a diagrammatic illustration of the invention, applied to a water pipe.
Figure 2:
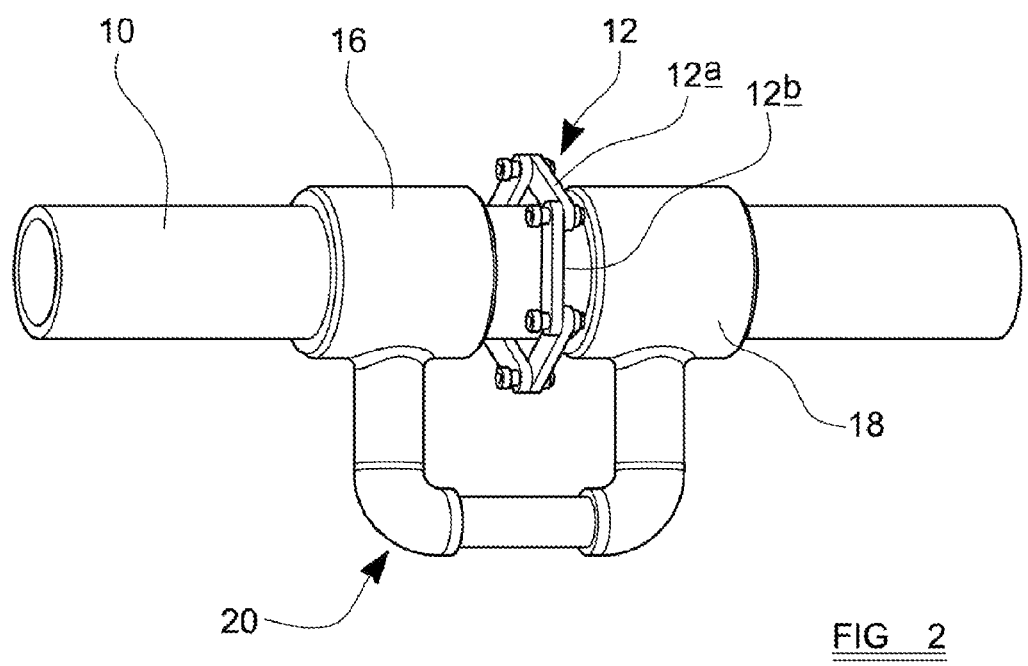
FIG. 2 is a perspective view of the apparatus diagrammatically illustrated in FIG. 1.

To each side of the core 12, respective T-pieces 16, 18, and associated pipework indicated generally at 20, establish a passage indicated at 22 in FIG. 1, connecting the pipe 10 between regions on opposite sides of the core 12. The pipework 20 establishing the passage 22 is preferably of a non-conductive, e.g. a suitable plastics, material, or it may incorporate a length of non-conductive material, so that it is the liquid within the passage 22 which determines the electrical resistance between the regions of the liquid in the pipe 10 on opposite sides of the core 12.

In use, the effect of the core 12 on the liquid within the pipe 10 is to establish, within the pipe, the conditions which would exist if conventional electrodes were to be placed inside the pipe on opposite sides of the core 12. This effect is illustrated in broken lines in FIG. 1. The resistance afforded by the passage 22 and/or the liquid within the passage determines the electrical current which flows between the electrodes, which may be adjusted to suit the purpose for which the electrodes have been provided.

Methods whereby the electrical resistance afforded by the passage or preferably the liquid therewithin are referred to above. Possibly another core and primary coil may be disposed about the passage 22, the primary coil being energised in such a way as to control the effect of the electrodes established by the core 12.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of establishing electrodes in a region of an electrically conductive liquid flowing along a pipe, the method comprising:
   surrounding the pipe containing the liquid by a core of magnetically conductive material which passes through a primary coil energized by an electrical signal to create an electric field within the liquid;
   connecting a secondary passage at the region for the liquid to flow between opposite sides of the core; and
   restricting the flow of the liquid in the secondary passage to create an electrical resistance along which an electrical current flows through the liquid.

2. The method according to claim 1, wherein the restricting is performed by altering a length of the secondary passage.

3. The method according to claim 1, wherein the restricting is performed by altering a cross-section of the secondary passage.

4. The method according to claim 1, wherein the connecting is performed by inserting a first pipe tee fitting upstream of the region, by inserting a second pipe tee fitting downstream of the region, and by connecting a pipework between the fittings.

5. The method according to claim 2, and configuring the pipework of a non-electrically conductive material.

* * * * *